(No Model.)

W. P. SHATTUCK.
PERMUTATION LOCK.

No. 451,529. Patented May 5, 1891.

Witnesses.
C. E. Van Doren,
O. G. Hawley.

Inventor.
William P. Shattuck
By Paul —— Att'ys

UNITED STATES PATENT OFFICE.

WILLIAM P. SHATTUCK, OF MINNEAPOLIS, MINNESOTA.

PERMUTATION-LOCK.

SPECIFICATION forming part of Letters Patent No. 451,529, dated May 5, 1891.

Application filed July 5, 1890. Serial No. 357,808. (No model.)

*To all whom it may concern:*

Be it known that I, WILLIAM P. SHATTUCK, of Minneapolis, in the county of Hennepin and State of Minnesota, have invented certain Improvements in Permutation-Locks for Toy Safes, of which the following is a specification.

My invention relates to toy safes; and its object is to provide a miniature permatation-lock of such simple construction as to be economically used upon a toy safe, and in connection therewith a bolt and bolt-handle, the whole having the appearance of similar devices used upon the large safes.

My invention consists, generally, in the construction and combinations hereinafter described, and particularly pointed out in the claim.

Figure 1:
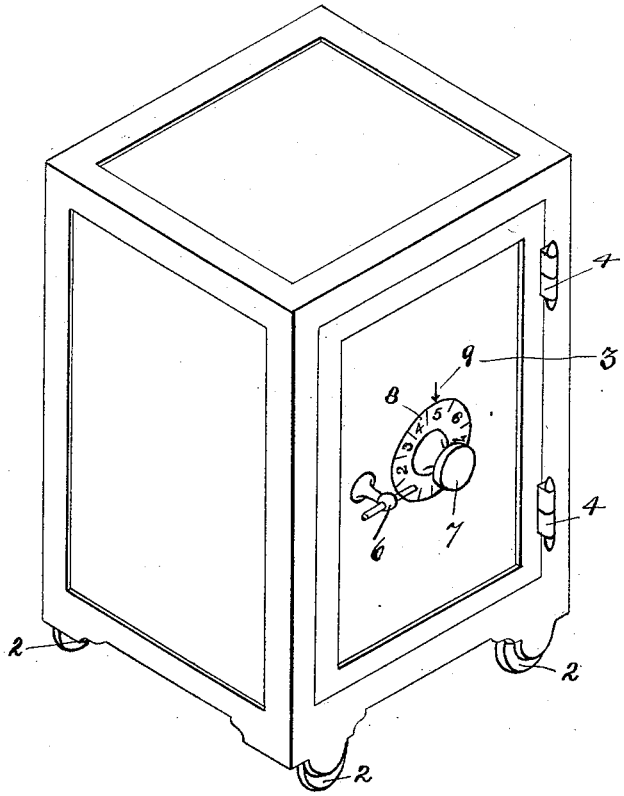
Figure 2:
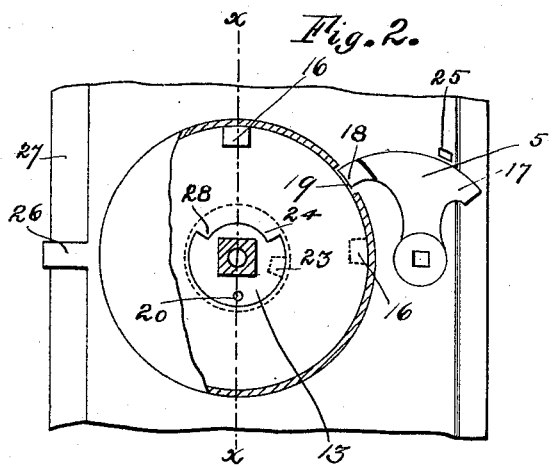
Figure 3:
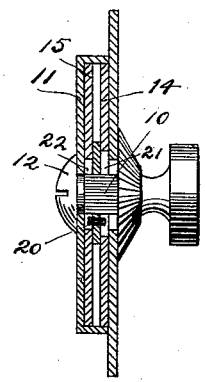

In the accompanying drawings, forming a part of this specification, Figure 1 is an isometric view of a safe embodying my invention. Fig. 2 is a detail view of my permutation-lock as applied to the door. Fig. 3 is a sectional elevation of the same upon line *x x* of Fig. 2.

As shown in the drawings, the safe is preferably made rectangular, and is provided with the imitation roller-wheels 2. The door 3 is hinged to the front plate of the safe in any suitable manner, as by the hinges 4, and bears the permutation-lock and the swinging bolt and dog device, which is operated by the handle 6, extending through to the outside of the door. The knob 7 is patterned after the common form and bears the scale 8, divided into equal spaces 1, 2, 3, 4, &c., as shown, and is adapted to be revolved to adjust the lock, the predetermined combination figures being thus brought opposite the arrow-point 9. The knob 7 is provided with the square spindle 10, extending through the door-plate. The end of the spindle is rounded and finds a bearing in the shield or cover 11, the screw 12 being screwed into the spindle to hold the knob and cover in place against the front of the door. The driving-disk 13 is provided with a square hole, and is adapted to slip over the square portion of the spindle 10, the notched disk 14 being first placed in position, as shown. The disk 15 is then placed over the driving disk or wheel and the cover 11 secured in position by screwing the bolt 12 into the end of the spindle. It is thus seen that the revolving disks 14 and 15, each of which is provided with a notch 16, are held centrally in position over the spindle by the cover 11 and are independent of the spindle, except as they are moved by the driving-disk 13 attached thereto. The bolt and dog device is provided with the bolt 17 and the dog 18, which dog is adapted to enter the notches 16 when they are registered before the opening 19 in the cover 11. The driving-disk is provided with the pin 20, projecting from either side thereof, as shown. The notched disks 14 and 15 are provided with the openings 21 and 22, respectively, at their centers, these openings being of diameter greater than that of the stud 10, but smaller than the driving-disk 13. The openings 21 and 22, however, do not form complete circular openings, but are provided in shapes varying with the different combinations of different locks, with the inwardly-projecting portions or stops 23 and 24 having a sufficient length radially to intercept and engage with the pin 20 in the disk 13, when said disk is turned through the medium of the knob 7. A stop 25 is provided upon the door-plate to limit the outward movement of the bolt device 5. The lug 26 projects from the inner surface of the door, a space being formed between the portion 27 of the door and the lug 26, into which the projecting stop upon the door-frame enters when the door is closed.

The operation of the permutation-lock shown in the drawings would be as follows: The knob 7 would be turned so as to carry the pin 20 upwardly against the lower edge of the projecting stop 23 upon the revolving disk 14, the knob being turned until the notch 16 in the disk was brought opposite the opening 19 and the dog 18. Up to this time any movement of the disk 15 is disregarded. The knob, with the driving-disk 13, would now be turned back in the opposite direction until the pin 20 was brought against the edge 28 of the projecting portion 24 on the disk 15 and the knob turned until the notch 16 in the disk 15 is brought before the opening 19 to correspond with the similar opening in the disk 14, in which position space would be given into which the dog 18 could be moved by turning back the handle 6, thus withdrawing the bolt 17 from behind the stop upon the inside of the door-frame when the door may be swung open.

Having thus described my invention, I claim as new and desire to secure by Letters Patent—

The combination, in a toy safe provided with an outwardly-opening door, of the knob 7, bearing the indicator 8, with a stud projecting from said knob through the door-plate, notched disks placed centrally over said stud and held in position by a cover, the edges of which form stops adapted to hold said disks against lateral movement, said cover being held in position by a bolt screwed into the inner end of the said stud, central openings in said notched disks, said openings provided with inwardly-projecting portions or stops, a driving-disk secured to said stud and provided with pins adapted to engage said inwardly-projecting stops, and a bolt and a dog made of one piece and adapted to be operated by a handle upon the outside of said door, said dog adapted to enter the notches in said revolving notched disks when said notches are made to register before said dog by the operation of said driving-disk, substantially as described.

In testimony whereof I have hereunto set my hand this 24th day of June, 1890.

WILLIAM P. SHATTUCK.

In presence of—
C. G. HAWLEY,
A. M. GASKILL.